United States Patent [19]

McCabe

[11] 3,959,515

[45] May 25, 1976

[54] PROCESS FOR PREPARING QUICK-COOKING BROWN RICE AND THE RESULTING PRODUCT

[76] Inventor: Douglas McCabe, 547 W. Third St., Elmhurst, Ill. 60126

[22] Filed: Nov. 20, 1972

[21] Appl. No.: 308,132

[52] U.S. Cl. .............................. 426/627; 426/462
[51] Int. Cl.² ........................................ A23L 1/00
[58] Field of Search ............ 99/80 PS; 426/627, 462

[56] References Cited
UNITED STATES PATENTS 2,438,939    4/1948    Ozai-Durrani .................... 99/80 PS
3,086,867    4/1963    Willer .............................. 99/80 PS

*Primary Examiner*—Raymond N. Jones

[57] ABSTRACT

Brown rice is made quick-cooking, that is, cooking by 5 minutes of boiling in the home in contrast with the customary time of 30 to 40 minutes required for unprocessed brown rice, by a series of soaking and baking steps, with the last step having both baking and drying effects.

2 Claims, No Drawings

PROCESS FOR PREPARING QUICK-COOKING BROWN RICE AND THE RESULTING PRODUCT

This invention relates to a new and unique article of manufacture, namely, brown rice which is quick-cooking and which possesses the additional new and unique attributes described below, and this invention further relates to the process of making the said article of manufacture.

The object of this invention is to produce a new and unique article of manufacture consisting of brown rice so processed that it is quick-cooking, that is, requires only 5 minutes of boiling before being eaten, whereas unprocessed brown rice requires 30 to 40 minutes of such boiling, this improvement in the art of commercially processed food being accomplished by a new and unique process consisting of a new and unique sequence of operations in the following order: soaking, baking, a second soaking and a second baking, the operations of soaking and baking being old in the food-processing art but the sequence itself, which is of the essence of this invention, being new and unique and indispensable to the making of the new and unique article of manufacture, with the newness and uniqueness of the sequence being further characterized, distinguished and de-limited by the time and the temperature with which each of the four steps of the sequence is performed.

In addition to the new and unique quick-cooking attribute of this new and unique article of manufacture, there are additional new and unique attributes which are very desirable and which are described below.

It is not necessary to design special equipment for the soaking and baking operations inasmuch as various soaking tubs, vats or containers and various baking ovens presently available commercially are suitable for the process herein described.

An individual grain of rice, when harvested, is enclosed in an inedible hull or husk which is removed by a commercial rice miller, leaving the individual grain of rice in the form known as brown rice, which is describable or identifiable as a starchy center surrounded by a covering or integument of bran, with the grain's biological germ imbedded at one tip of the grain and with the shape of the grain being round and somewhat elongated. The well-known nutritive elements in brown rice, consisting principally of vitamins and minerals, are in the bran and germ but not in the starchy center. Brown rice gets its name from the fact that it is noticeably darker in color than white rice (which is hereinafter described) although not actually brown, due to the external layer of bran, which layer has been removed in the case of white rice.

Orientals, for many of whom rice is a basic staple of diet in place of such starchy foods as wheat and corn, generally eat brown rice rather than white rice and it is important that they do so because brown rice is their principal source of Vitamin $B_1$, the absence of which causes multiple neuritis, a vitamin-deficiency disease usually called beriberi, its effects being, in extreme cases, a general debility and a painful rigidity of the body. But in the United States of America and other occidental countries, which are not dependent upon brown rice as a source of Vitamin $B_1$, brown rice is seldom eaten, although some food stores carry it, notably health food stores, the popular form of rice being white rice.

White rice is the starchy center of the grain of rice and it is what remains after the rice milling industry removes the bran and germ, both of which are disposed of, together with the nutritive elements which they contain, as healthful ingredients in animal feed. White rice cooks more rapidly than does brown rice and this fact, together with its white color, which has the same aesthetic appeal as white bread in comparison with whole-wheat bread, has made it more popular in occidental countries than brown rice.

So-called "converted" rice, which has attained commercial success in the United States of America, is a compromise or half-way point between brown rice and white rice. The so-called "conversion" process consists in the use of steam, preferably after the atmospheric air has been substantially removed from the grain of brown rice by a vacuum process, to propel nutritive elements out of the bran and germ into the starchy center, after which the bran and germ are milled off, leaving the material in the visual form of white rice. "Converted" rice is a compromise in the sense that the bran and germ, which are themselves nutritive, are eliminated and only a portion of their vitamins and minerals have been transferred to the starchy center.

My new and unique article of manufacture is brown rice itself both before and after my new and unique process for making the article of manufacture imparts to it various desirable attributes not possessed by unprocessed brown rice, and not generally possessed by white rice. The first attribute, which is new and unique to brown rice, is quick-cooking, that is, requiring only 5 minutes of boiling before being eaten. Another new and unique desirable attribute is the fact that, unlike ordinary brown and white rice, my article of manufacture does not stick to the pan when boiled and therefore stirring by the cook is unnecessary, while, in addition, the pan is very easy to clean. Other new and unique desirable attributes are an appetizing cooking odor and a delicious taste which is somewhat nut-like, both the odor and taste appreciably excelling in quality the mild and more subdued odor and taste of unprocessed brown rice, while white rice in its various forms is odorless and tasteless. Still another new and unique desirable attribute is the exceptionally enjoyable palatability; that is, unlike most foods which have a predominant starch content, including unprocessed brown rice and white rice in its various forms, my new and unique article of manufacture offers pleasing resistance to the teeth when being chewed, and this pleasing resistance stimulates a desire to chew more of the article of manufacture, a desire which is a decided advantage in all foods which are of the type which requires chewing to any extent, particularly in the case of the finicky appetites of children and invalids. Also, my article of manufacture has the new and unique desirable attribute of not requiring the extreme care in cooking rice in any of its presently available forms which the most professionally written cookbooks recommend in order to keep the individual grains of rice from sticking together in a mushy condition which is not appetizing. Still further, my article of manufacture, partly because of its new and unique quick-cooking attribute and partly because of its new and unique desirable attributes of odor, taste and palatability, is, unlike unprocessed brown rice and white rice in its various forms, highly attractive as a warm breakfast food served in the manner characteristic of oatmeal, but without the mushiness of oatmeal; unprocessed brown rice and white rice in its various forms are not generally deemed to be suitable to be eaten by themselves, such as in the form of a warm breakfast food, because their major attraction is that they absorb and take on the flavors of other foods with which they are served, such as meat and gravy, an attraction which my article of manufacture retains without being limited to it. Finally, my article of manufacture is new and unique in visual appearance before and after being boiled by a cook, and it is not at any time visually identifiable as being rice, partly because my process imparts to it a medium dark baked and brownish color and partly because it has lost the round and somewhat elongated shape characteristic of rice; while in the dry state prior to being boiled, it has a shrivelled shape in the sense that a raisin is a shrivelled grape, and, moreover, a substantial percentage of the grains has broken into several separate, relatively tiny shrivelled bits or pieces of a single grain; and after being boiled and therefore being ready to be eaten, it still does not have the visual appearance of rice because each separate grain, and each bit or piece of a broken grain, has an irregular, indeterminate and amorphous shape approximating the appearance of cooked oatmeal but with each grain, and each bit or piece of a grain, distinct and separate by itself without any tendency to merge into a mushy mass with others.

The new, unique and indispensable process required for making of my new and unique article of manufacture consists in the following sequence of soaking and baking operations with the further distinguishing characteristic of approximately specified time and temperature within important limits for each operation, the sequence itself and the times and temperatures being of the essence of the process, which is herewith described in detail as follows:

Step 1: Soak in room-temperature water for 2 to 3 hours in order to saturate the brown rice with water. The time can be reduced somewhat by using warm water, but hot water causes undesirable stickiness and mushiness.

2: Bake for approximately 40 minutes at a temperature of 300° to 350° F. to dry the brown rice and impart to it a light brown color.

Note: Step 1 can be eliminated if Step 2 is performed for approximately 20 minutes at a temperature of approximately 450° F., but this modification in the process has the disadvantage that extreme caution is required to avoid scorching, which detracts from the optimum odor, taste and palatability of the finished article of manufacture.

Step 3: Soak a second time in room-temperature water for 2 to 3 hours, this operation causing the brown rice to swell to double or more its original size with the completion of the operation being indicated by the fact that no further swelling is occurring. The time can be reduced somewhat by using warm water, but hot water is undesirable as it causes stickiness and mushiness.

Step 4: Bake a second time for approximately 40 minutes at a temperature of 300° to 350° F. to dry the brown rice and impart to it a medium brown color.

Note: The time and temperature factors described above for the two baking operations are based upon the use of an oven which does not have forced air circulation and which does not vent moist air; in the case of ovens having forced air circulation and/or venting of moist air, practical experience indicates the optimum time and temperature, both of which, but particularly the time, will be somewhat less than as described above.

The size or capacity of the oven to be used for the baking operations is determined by the commercial quantity desired; in the case of relatively small quantities, the tray-type cabinet ovens, for example, which are commercially available presently in the food processing industry are suitable, while in the case of larger quantities the continuous-flow rotary-type cylindrical ovens, for example, which are presently commercially available in the food processing industry are suitable.

I claim:

1. Brown rice processed into a shape which is not, before or after being boiled by a cook, visually identifiable as being rice in any presently known form, each individual grain prior to boiling by a cook being shrivelled in the sense that a raisin is a shrivelled grape, and with a substantial percentage of the grains broken into several separate, relatively tiny shrivelled bits or pieces of a single grain, all of a medium brown color, and after boiling for 5 minutes with each individual grain and each bit or piece of a grain having an irregular, indeterminate and amorphous shape approximating the appearance of a kernel of cooked oatmeal but with each individual grain and each bit or piece of a grain physically and visually distinct and separate by itself without any tendency to merge into a mushy mass with others.

2. The process required to make the brown rice product of claim 1, the process consisting in four steps in sequence as follows, namely, soaking, baking, soaking a second time and baking a second time; the time of soaking in each of the two soaking operations being approximately 2 to 3 hours in room-temperature water and slightly less in warm water, but hot water being undesirable as it causes stickiness and mushiness, the first soaking operation saturating the material with water and the second soaking operation causing the material to more than double in size; each of the two baking operations being performed at approximately 300° to 350°F. for approximately 40 minutes, the first baking operation rendering the material dry and light brown in color and the second baking operation rendering the material dry and medium brown in color.

* * * * *